(No Model.) 3 Sheets—Sheet 1.
T. H. BURRIDGE.
CAR BRAKE.
No. 383,387. Patented May 22, 1888.
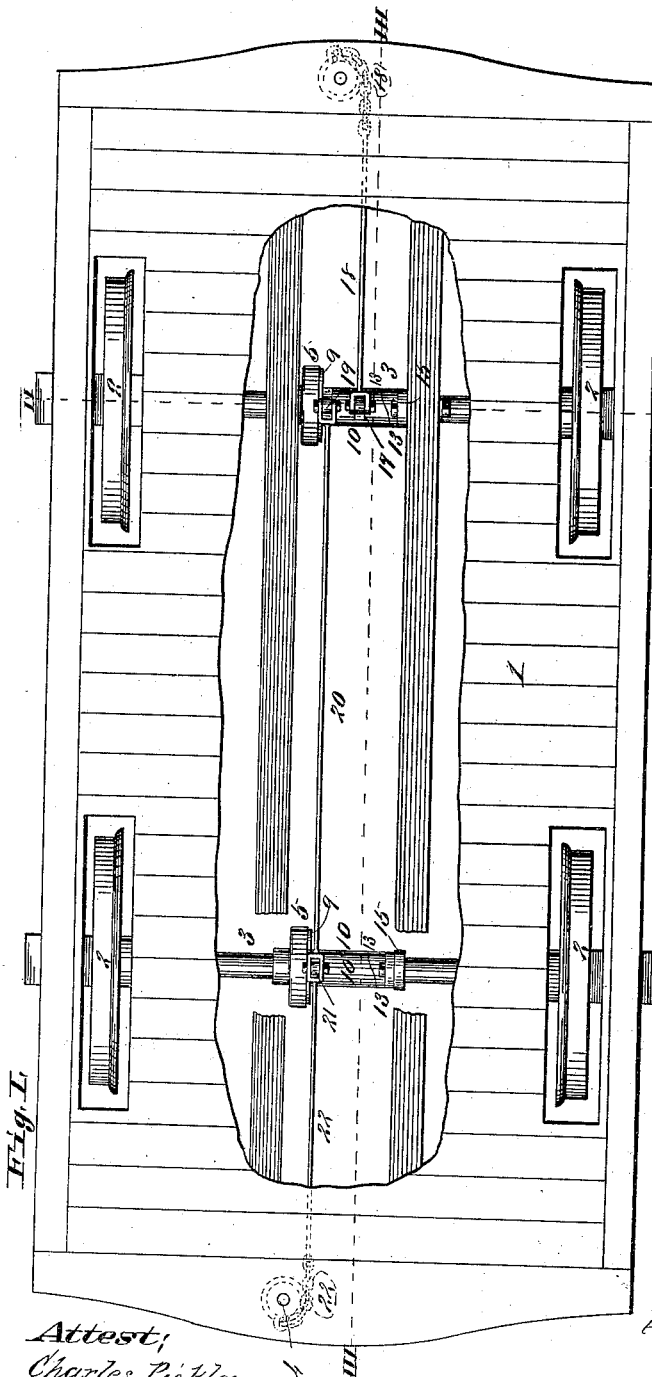
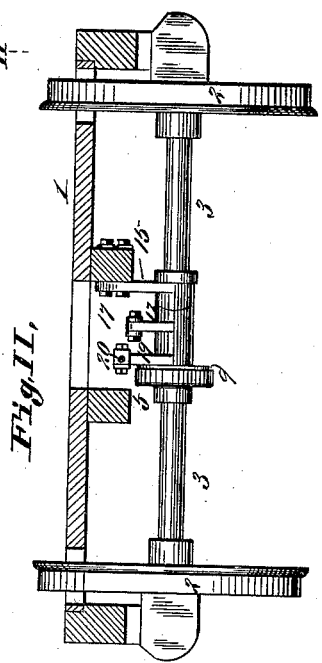
Attest:
Charles Pickles
Emma Arthur
Inventor:
Tho's H. Burridge,
By Knight Bro's
atty's.
N. PETERS, Photo-Lithographer, Washington, D. C.

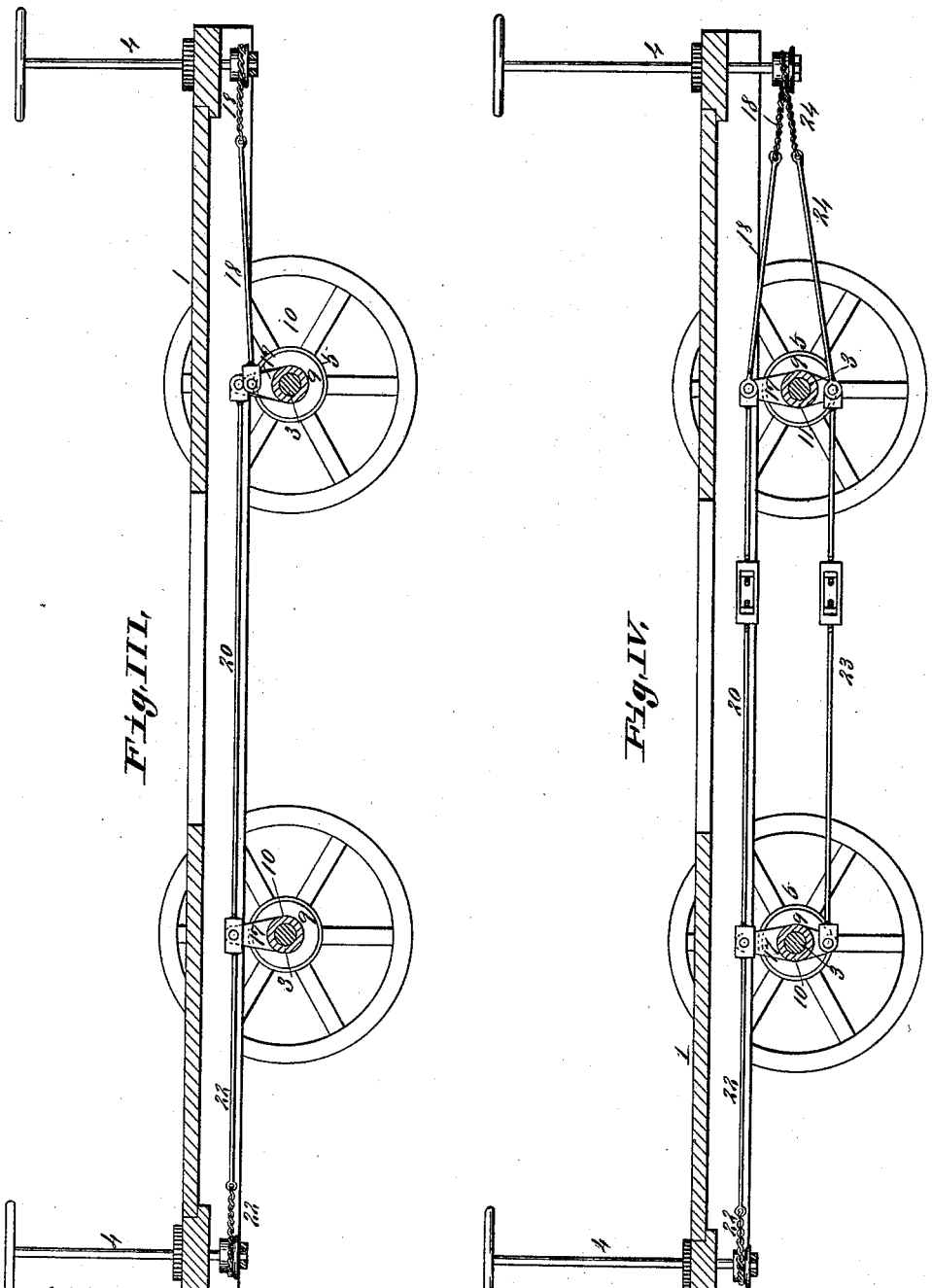

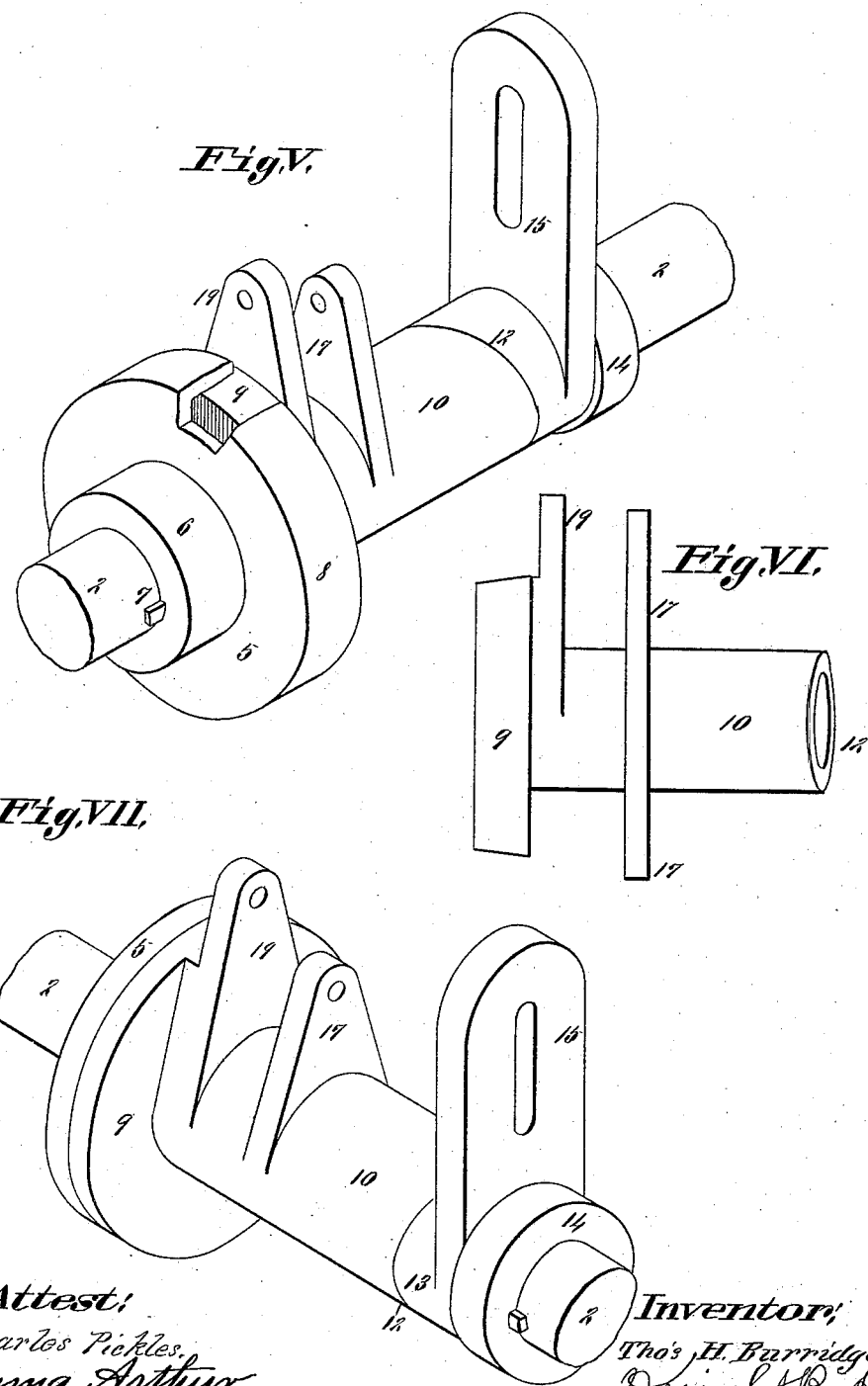

UNITED STATES PATENT OFFICE.

THOMAS H. BURRIDGE, OF ST. LOUIS, MISSOURI.

CAR-BRAKE.

SPECIFICATION forming part of Letters Patent No. 383,387, dated May 22, 1888.

Application filed December 16, 1887. Serial No. 258,097. (No model.)

*To all whom it may concern:*

Be it known that I, THOMAS H. BURRIDGE, of the city of St. Louis, in the State of Missouri, have invented a certain new and useful Improvement in Car-Brakes, of which the following is a full, clear, and exact description, reference being had to the accompanying drawings, forming part of this specification, and in which—

Figure I is a bottom view of a street-car with my improved brake applied. Fig. II is a vertical transverse section taken on line II II, Fig. I. Fig. III is a vertical longitudinal section taken on line III III, Fig. I. Fig. IV is a similar view, but showing an additional feature consisting of a means for insuring a positive release of the brake. Fig. V is an enlarged detail perspective view showing the friction-disks, sleeve, and cam. Fig. VI is an enlarged detail elevation showing one of the friction-disks and part of the sleeve. Fig. VII is a similar view to Fig. V, except that it shows flat plain friction-disks instead of flanged and conical.

My invention relates to an improved brake intended more particularly for street-cars, but which may be applied to other cars; and my invention consists in features of novelty hereinafter fully described, and pointed out in the claims.

Referring to the drawings, 1 represents the body of a car, 2 the wheels, and 3 the axles.

4 represents the winding-shafts of the brake.

On one or both of the axles (I will describe the construction of the device in connection with one of the axles) is a fixed disk, 5, preferably having a collar or hub, 6, on its outer face. I have shown the disk keyed to the axle at 7. This disk may have a flange, 8, as shown in Fig. V, or may be plain, as shown in Fig. VII. If the flange is used, it will be made tapering on its inner surface, as shown in Fig. V.

9 represents a second disk formed upon or secured to a sleeve, 10. This disk may have a tapering periphery, as shown in Figs. V and IV, or it may be made plain, as shown in Fig. VII. It will be made tapering when used in connection with the flanged disk 5 and made plain when used in connection with the plain disk 5. The sleeve 10 is loose upon the axle and movable endwise thereon. At its outer end it is provided with an inclined surface, 12. (Shown most clearly in Fig. VI.) At this end of the sleeve and surrounding the axle is a cam, 13, loose upon the shaft, but held from movement away from the sleeve by means of a flat collar, 14, on the axle. The cam 13 is kept from turning on the axle by means of an arm or projection, 15, by which it is secured to the body of the car, as shown at 16 in Fig. II. The working-face of the cam corresponds in shape with the incline or projection 12 on the sleeve 10.

17 represents an arm on the sleeve 10, to which the pull-rod and chain 18 are secured at one end, the other end being connected to the winding-shaft 4.

The operation is as follows: When the brake is to be applied, the shaft 4 is turned, pulling on the rod and chain 18. In doing this the sleeve 10 is turned and the incline 12, bearing against the cam 13, forces the sleeve and its disk 9 over into frictional contact with the disk 5, thus applying the brake. As soon as the power is removed from the shaft 4 the sleeve will move back to its normal position and the brake will be released.

I have described the operation of the brake on one of the axles, but the other axle may be provided with a similar arrangement, in which case the sleeve 10 would be provided with an additional arm, 19, similar to that 17, which would be connected by means of a rod, 20, to an arm, 21, on the sleeve 10 on the other axle, (see Fig. I,) this sleeve being arranged the same as and having the accompanying parts already described in connection with the other sleeve.

The arm 21 may have a pull-rod and chain, 22, connecting it to the winding-shaft 4 at the other end of the car.

In case it should be found necessary to have a positive means for removing the brake, it may be easily accomplished by extending the arms 17 and 21 downward beneath the sleeves, connecting them by means of a rod, 23, and connecting the extension of the arm 17 to the shaft 4 by means of a rod and chain, 24. (See Fig. IV.)

I claim as my invention—

1. In combination with the axle of a street-car, a fixed disk, a movable disk, sleeve on the axle, to which the movable disk is secured, stationary cam on the axle in contact with one end of the sleeve, and means for turning the sleeve to apply the brake, substantially as and for the purpose set forth.

2. In combination with the axle of a car, a fixed disk, the movable disk, sleeve on the axle, a disk secured to the movable sleeve, a stationary cam on the axle, and means for turning the sleeve to apply the brake, said sleeve having an incline on the opposite end from the movable disk, said incline adapted to bear against the cam when the sleeve is turned, substantially as and for the purpose set forth.

3. In combination with the axle of a car, a fixed disk, 5, rigidly secured to the axle, sleeve 10, mounted loosely on the axle, disk 9, formed upon or secured to the sleeve, cam 13, mounted loosely on the axle, and connected to the bottom of the car, and collar 14 to prevent end movement of the cam, substantially as and for the purpose set forth.

4. In combination with the axle and body of the car, a fixed disk, 5, sleeve 10, movable disk 9 on the sleeve, arms 17 and 19 on the sleeves, cams 13, arms 15, connecting the cams to the bottom of the car, collars 14 to prevent end movement of the cams, and means for connecting the arms of the different sleeves and for operating one of the sleeves, substantially as and for the purpose set forth.

THOMAS H. BURRIDGE.

Witnesses:
 SAML. KNIGHT,
 JAS. E. KNIGHT.